United States Patent
Fink et al.

(10) Patent No.: US 8,212,663 B2
(45) Date of Patent: Jul. 3, 2012

(54) WHEEL ELECTRONICS SYSTEM AND METHOD FOR OPERATING A WHEEL ELECTRONICS SYSTEM

(75) Inventors: Alexander Fink, Regensburg (DE); Frank Fischer, Regensburg (DE); Gregor Kuchler, Regensburg (DE)

(73) Assignee: Continental Automotive GmbH, Hannover (DE)

( * ) Notice: Subject to any disclaimer, the term of this patent is extended or adjusted under 35 U.S.C. 154(b) by 382 days.

(21) Appl. No.: 12/524,815

(22) PCT Filed: Jan. 29, 2008

(86) PCT No.: PCT/EP2008/051063
§ 371 (c)(1),
(2), (4) Date: Jul. 28, 2009

(87) PCT Pub. No.: WO2008/095834
PCT Pub. Date: Aug. 14, 2008

(65) Prior Publication Data
US 2010/0060444 A1 Mar. 11, 2010

(30) Foreign Application Priority Data
Feb. 9, 2007 (DE) .......................... 10 2007 007 136

(51) Int. Cl.
*B60C 23/00* (2006.01)
(52) U.S. Cl. ........ 340/447; 73/146.5; 340/442; 340/445
(58) Field of Classification Search .................. 340/5.61, 340/442, 444, 445, 447; 73/146.5
See application file for complete search history.

(56) References Cited

U.S. PATENT DOCUMENTS

| 5,774,048 A | 6/1998 | Achterholt |
| 6,445,286 B1 * | 9/2002 | Kessler et al. ................ 340/442 |
| 6,667,687 B1 | 12/2003 | DeZorzi |
| 7,137,296 B2 * | 11/2006 | Shida et al. .................. 73/146.5 |
| 2005/0110623 A1 * | 5/2005 | Schulze et al. ............... 340/445 |
| 2006/0071768 A1 | 4/2006 | Iwazumi et al. |
| 2007/0068240 A1 * | 3/2007 | Watabe ....................... 73/146.5 |
| 2007/0090919 A1 | 4/2007 | Desai et al. |

FOREIGN PATENT DOCUMENTS

| DE | 10217239 A1 | 7/2003 |
| DE | 10295892 T5 | 6/2006 |
| DE | 102006042679 A1 | 4/2007 |
| WO | 9418018 A1 | 8/1994 |

OTHER PUBLICATIONS

International Search report dated Apr. 22, 2008.
German Office Action dated Dec. 13, 2007.
International Written Opinion of the International Searching Authority.

* cited by examiner

*Primary Examiner* — Brent Swarthout
(74) *Attorney, Agent, or Firm* — Laurence A. Greenberg; Werner H. Stemer; Ralph E. Locher

(57) ABSTRACT

A wheel electronic system and a method for operating a wheel electronic system. The wheel electronic system interacts with a tire secured to a vehicle and produces and emits, based on a captured trigger signal, a message containing information on at least one tire parameter measured with the wheel electronic system. The wheel electronic system is operated in an operational mode in which the system is configured to periodically capture the trigger signals in a first time period. Based on a predetermined first operational ratio of the vehicle, the wheel electronic system automatically switches to a test mode, in which the wheel electronic system is configured to periodically capture the trigger signals in a second time period which is substantially shorter than the first time period.

12 Claims, 2 Drawing Sheets

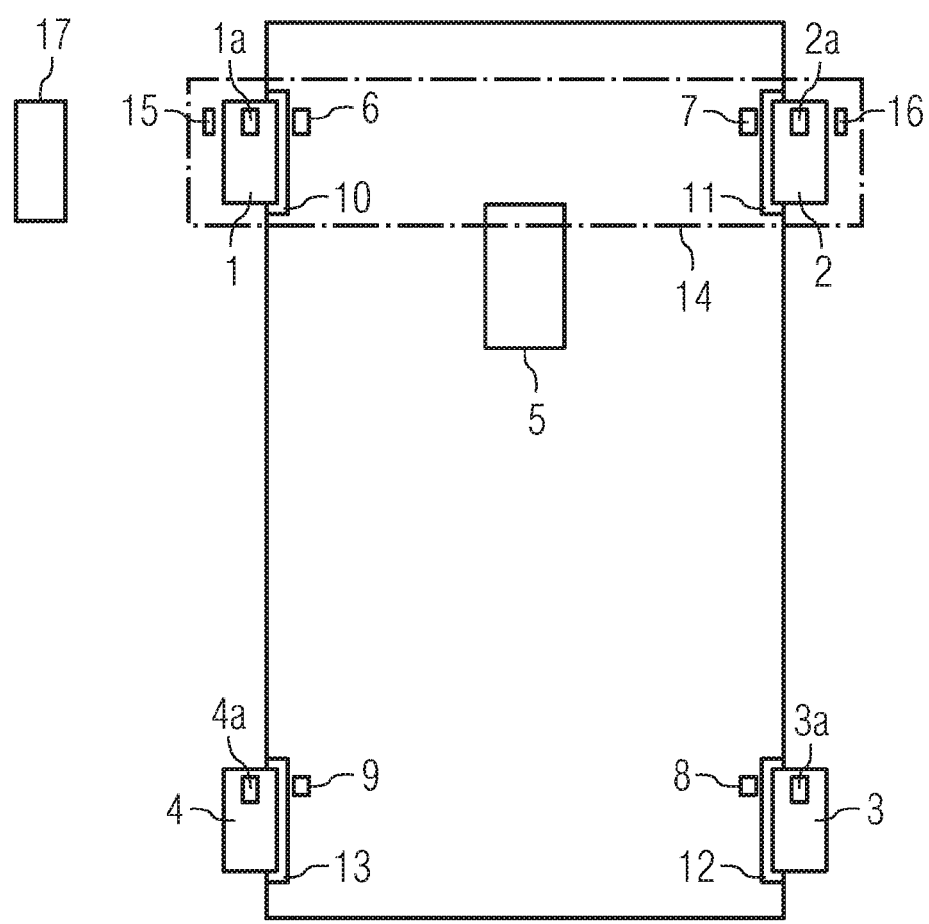

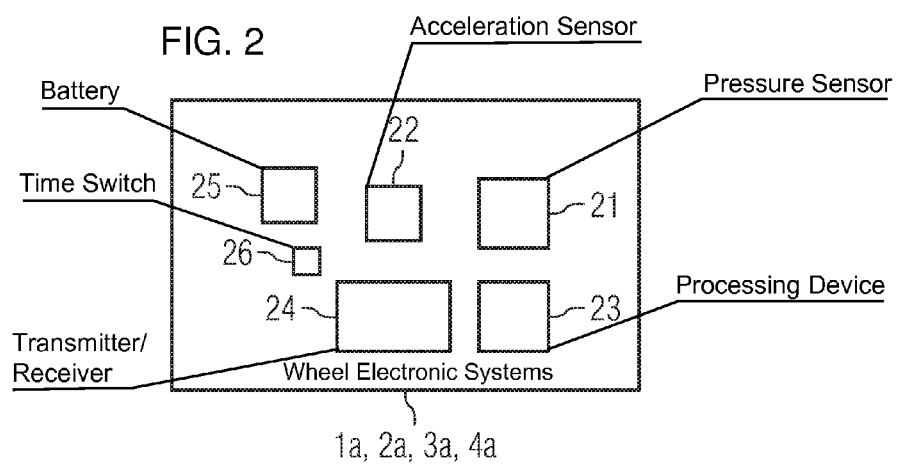
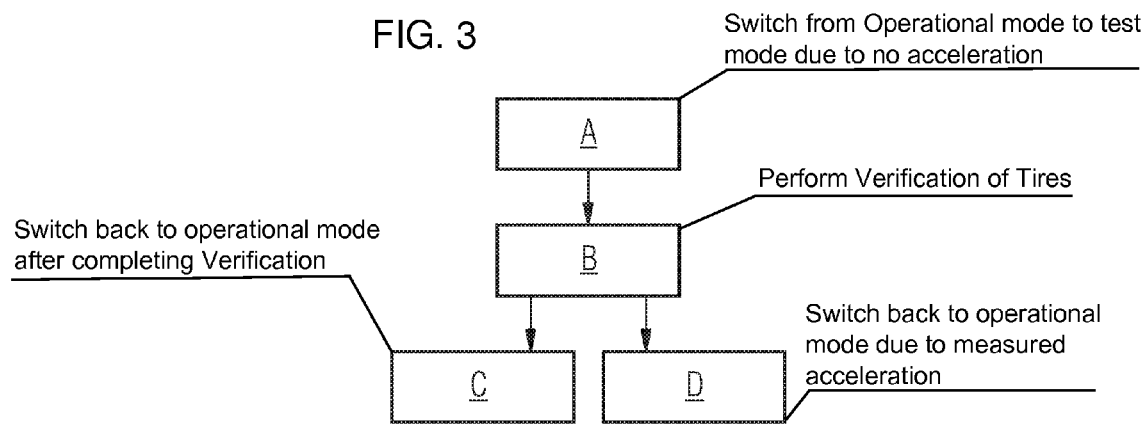

WHEEL ELECTRONICS SYSTEM AND METHOD FOR OPERATING A WHEEL ELECTRONICS SYSTEM

BACKGROUND OF THE INVENTION

Field of the Invention

The invention relates to a wheel electronics system and a method for operating a wheel electronics system.

Many vehicles are equipped with a device for automatically checking the tire pressure of the tires of the vehicle. The tire pressure check is realized by means of a wheel electronics system which interacts with the tire that must be monitored. As a result of a received trigger signal, the wheel electronics system measures the tire pressure of its tire and wirelessly transmits a message containing information about the measured tire pressure to a receiver, which is arranged in or on the vehicle and forwards the received message to an analysis device.

In order to save electrical energy that is used for the wheel electronics system, the wheel electronics system is activated and deactivated periodically. It can only receive the trigger signal while it is activated.

During operation of the vehicle whose tire pressures are monitored, the time period for activation of the wheel electronics system is relatively long. This corresponds to an operational mode of the wheel electronics system. During manufacture of the wheel electronics system, the wheel electronics system is therefore operated in a test mode, in which the time period for the activation of the wheel electronics system is significantly shorter than the time period of the operational mode.

In particular, the tires of trucks are serviced regularly. As part of this servicing, the tires are examined, e.g. by verifying their tire profiles or tire pressures.

If the truck has the wheel electronics systems, these could also be used for the servicing and verification of the tires. Because the servicing of the truck is carried out during live operation, however, conventional wheel electronics systems are switched to operational mode during the servicing, and therefore a reply from the wheel electronics system to a query takes a relatively long time. For the purpose of servicing the truck, it is therefore desirable for the wheel electronics system to be operated in its test mode.

BRIEF SUMMARY OF THE INVENTION

The invention therefore addresses the problem of specifying a method for operating a wheel electronics system, by means of which the wheel electronics system can be switched relatively easily from its operational mode to its test mode.

The invention also addresses the problem of specifying a wheel electronics system which allows relatively simple switching from the operational mode to the test mode.

The problem addressed by the invention is solved by a method for operating a wheel electronics system which interacts with a tire that is attached to a vehicle and, as a result of a received trigger signal, generates and wirelessly transmits a message, said message comprising information about at least one tire parameter that is measured by the wheel electronics system, comprising the following method steps:

operating the wheel electronics system in an operational mode in which the wheel electronics system is configured to receive the trigger signals periodically using a first time period, as a result of a predetermined first operating characteristic of the vehicle, automatically switching the wheel electronics system to a test mode in which the wheel electronics system is configured to receive the trigger signals periodically using a second time period which is significantly shorter than the first time period, and operating the wheel electronics system in the test mode.

The further problem addressed by the invention is solved by a wheel electronics system comprising a sensor for measuring at least one parameter of a tire, said sensor being mounted on a vehicle and interacting with the wheel electronics system during operation of the vehicle, a receiver for receiving an external trigger signal, a processing device which generates a message comprising information about the measured tire parameter when the receiver receives the trigger signal, and a transmitter for transmitting the message comprising information about the measured tire parameter, wherein the wheel electronics system is configured to receive the trigger signals periodically using a first time period in an operational mode and to receive the trigger signals using a second time period which is significantly shorter than the first time period in a test mode, and wherein the wheel electronics system is configured to switch automatically from the operational mode to the test mode as a result of a predetermined first operating characteristic of the vehicle.

The wheel electronics system according to the invention is intended to interact with its tire during operation of the vehicle and to measure the at least one parameter if applicable. The parameter is in particular the tire pressure or the temperature of the tire concerned. The sensor for measuring at least one parameter is therefore a pressure or temperature sensor.

The wheel electronics system according to the invention is embodied such that as a result of the trigger signal, which originates e.g. from a transmitter that is arranged in or on the vehicle and can be received by the receiver of the wheel electronics system, it measures the parameter, generates the message using the parameter, and wirelessly transmits said message. The message can be transmitted e.g. by means of a high-frequency signal having a frequency higher than 200 MHz, for example, and the trigger signal can be a low-frequency signal of less than 200 kHz, for example. The message can then be received by a receiver of the vehicle and analyzed by an analysis device of the vehicle. If the parameter is the tire pressure, the analysis makes it possible to warn the person driving the vehicle about an underinflation of the vehicle tire.

In order to save electrical energy, the wheel electronics system according to the invention is activated and deactivated periodically. If the wheel electronics system according to the invention is activated, it can receive the trigger signal and generate and transmit the message. In the operational mode, the time period (first time period) for activation of the wheel electronics system is relatively long, e.g. 30-60 seconds), while in the test mode, this time period (second time period) is considerably shorter, e.g. 1 second.

According to the invention, the wheel electronics system is configured such that it switches automatically from the operational mode to the test mode as soon as the wheel electronics system detects the predetermined first operating characteristic of the vehicle.

According to an embodiment of the inventive method, the predetermined first operating characteristic of the vehicle is a stoppage of the vehicle for a predefined first duration. A preferred use of the inventive method is in the context of servicing truck tires (mounted on trucks) in particular. If the truck is being serviced, the tire pressures of its tires can also be verified, for example. For the purpose of servicing, the truck remains stationary for a defined time, and therefore this variant of the inventive method provides for the inventive wheel electronics system to switch to its test mode automatically when the vehicle is standing for the predefined first duration. The first duration should be long enough to ensure that the wheel electronics system does not switch to its test mode even in the case of short stoppages of the vehicle, e.g. in the case of red light. The first duration can be selected according to specifications of the truck operator, for example, and adapted to the specific procedure of the servicing. The first duration is e.g. 15 minutes.

The stoppage of the vehicle can be ascertained e.g. by measuring an acceleration of the tire by means of an acceleration sensor of the wheel electronics system, in order to switch the inventive wheel electronics system from the operational mode to the test mode automatically if the acceleration measured by the acceleration sensor is less than a predetermined minimum acceleration during the first predetermined duration. The acceleration sensor measures an acceleration of the tire in a radial direction, i.e. it detects if the tire is turning. The minimum acceleration can be adjustable, but can also be the acceleration from which the acceleration sensor can measure an acceleration.

In particular, the method according to the invention is intended for servicing tires that are mounted on trucks. According to a variant of the method according to the invention, the truck is driven to a tire monitoring station and stops there. Upon arrival, trigger signals are transmitted using transmitters of the tire monitoring station, the message comprising information about the measured parameters is received, and the received message is analyzed using a diagnostic device of the tire monitoring station. One advantage of this variant of the inventive method is that the tire pressures of the tires of the truck, if they are equipped with wheel electronics systems according to the invention, can be verified automatically using the diagnostic device, even if the truck does not feature internal automatic tire pressure checking. Instead of the external diagnostic device, it is also possible to use an internal analysis device of the truck for the verification of the tire pressures in the context of the servicing.

As described above, according to a variant, the inventive wheel electronics system switches to its test mode automatically if its acceleration sensor measures a tire acceleration that is less than the minimum acceleration for the first duration. As a rule, the truck is initially parked for the servicing, and is only driven to the tire monitoring station after a defined time. If the truck is parked for long enough, the inventive wheel electronics system switches to its test mode automatically, such that the verification of the tire pressure can be carried out relatively quickly by means of the diagnostic device.

According to a variant of the inventive method, when the verification of the tire pressure is complete, the wheel electronics system is switched from the test mode to the operational mode as a result of a signal that is received by the wheel electronics system, said signal being generated by the diagnostic device and transmitted by the transmitter of the tire monitoring station, for example. For the operation of the truck, the wheel electronics systems are then switched back to their relatively energy-economical operational modes.

According to an embodiment of the inventive method or the inventive wheel electronics system, the wheel electronics system is automatically switched from the test mode to the operational mode as a result of a second operating characteristic of the vehicle. This is realized e.g. by means of the wheel electronics system switching automatically from the test mode to the operational mode if, following the switchover from the operational mode to the test mode, a predefined second duration has elapsed and/or if the acceleration sensor of the wheel electronics system measures a minimum acceleration of the tire over a predefined third duration. It is thus ensured that the inventive wheel electronics system does not remain in its test mode for longer than is absolutely necessary. The second duration is e.g. 1-24 hours.

For the purpose of verifying the tire pressures during servicing of the trucks, said trucks are initially parked for a specific duration for the service, such that the wheel electronics systems automatically switch over to their test modes. If the trucks are then driven to the tire monitoring station, this usually takes place at relatively low speed. This speed is normally so low that the acceleration sensors do not measure any acceleration and therefore do not automatically switch to their operational modes, if the wheel electronics systems are equipped according to the variant in which the acceleration sensor of the wheel electronics system measures a minimum acceleration for a predefined duration. If the acceleration sensor is to be relatively sensitive, the minimum acceleration can also be adjusted accordingly.

An exemplary embodiment of the invention is illustrated by way of example in the appended schematic drawings, in which:

BRIEF DESCRIPTION OF THE SEVERAL VIEWS OF THE DRAWING

FIG. 1 shows a plan view of a truck;

FIG. 2 shows a wheel electronics system of a tire of the truck; and

FIG. 3 shows a flow diagram to illustrate the method according to the invention.

DESCRIPTION OF THE INVENTION

FIG. 1 shows a plan view of a truck (LKW) in schematic form as an example of a vehicle.

In the case of the present exemplary embodiment, the LKW comprises two front wheels having one tire 1, 2 each and two rear wheels having one tire 3, 4 each. Each of the tires 1-4 is assigned a wheel electronics system 1a-4a, which is illustrated in greater detail in FIG. 2 and which automatically measures parameters of the relevant tire 1-4, e.g. its tire pressure. The wheel electronics systems 1a-4a are attached in a customary manner to the wheel rims of the front and rear wheels, for example, and are in contact with their tires 1-4. Alternatively, the wheel electronics systems 1a-4a can also be integrated into their assigned tires 1-4.

In the case of the present exemplary embodiment, the wheel electronics systems 1a-4a feature a pressure sensor 21, an acceleration sensor 22, a processing device 23 which is connected to the pressure and acceleration sensors 21, 22, and a transmitter/receiver 24 which is connected to the processing device 23, each of these being supplied with electrical energy by a battery 25.

The wheel electronics systems 1a-4a are intended to measure the current tire pressure of the corresponding tire 1-4 by means of their pressure sensors 21. The processing device 23 is intended inter alia to generate a message which relates to the measured tire pressure and is subsequently transmitted wirelessly via the transmitter/receiver 24. The message is transmitted e.g. by means of a high-frequency signal which has a frequency of more than 200 MHz, for example, and preferably 315 MHz or 433.92 MHz.

In the case of the present exemplary embodiment, the wheel electronics systems 1a-4a are intended to notify the person driving the LKW of the current tire pressures of the tires 1-4, in particular during travel, or to warn said person if one of the tires 1-4 has a tire pressure which is too low. The messages transmitted by the wheel electronics systems 1a-4a are therefore received in a customary manner by a receiver (not illustrated in greater detail in FIG. 1) which is arranged in the LKW, and are analyzed by an analysis device 5, e.g. by comparing the measured tire pressures with predetermined threshold values.

For reasons of efficiency, the transmitter/receivers 24 and the processing devices 23 are not continuously supplied with electrical energy from the battery 25, and the wheel electronics systems 1a-4a only measure the tire pressures and the processing devices 23 only generate their messages in response to the trigger signals received via the transmitter/receiver 24. In the case of the present exemplary embodiment, the wheel electronics systems 1a-4a are designed such that in particular their transmitter/receivers 24 and their processing devices 23 are activated for an instant at predetermined intervals, e.g. by means of a time switch 26, and are otherwise inactive, i.e. are not supplied with electrical energy. If the relevant transmitter/receiver 24 receives a trigger signal during this instant, the pressure sensor 21 measures the tire pressure, the processing device 23 generates the message containing information about the measured tire pressure, and the transmitter/receiver 24 transmits the message.

In addition, the wheel electronics systems 1a-4a can be operated in a test mode and in an operational mode. The test mode is activated in particular during the manufacture of the wheel electronics systems 1a-4a and the operational mode is activated in particular during the operation of the LKW. The test mode differs from the operational mode in that the time interval between two activations of the wheel electronics systems 1a-4a is significantly shorter than during the operational mode. In the case of the present exemplary embodiment, the wheel electronics systems 1a-4a can receive a trigger signal every second if the test mode is activated. If the operational mode is activated, the wheel electronics systems 1a-4a can receive a trigger signal every 30-60 seconds.

In the case of the present exemplary embodiment, the trigger signals are transmitted by transmitters 6-9, which are arranged at the LKW wheel housings 10-13 assigned to the tires 1-4 and are controlled by the analysis device 5. In the case of the present exemplary embodiment, the transmitters 6-9 transmit the trigger signals at a frequency of 125 kHz during the travel of the LKW.

In the case of the present exemplary embodiment, the test modes of the wheel electronics systems 1a-4a are activated when the tires 1a-4a are fitted to their wheels. If the acceleration sensor 22 measures a predetermined minimum acceleration in a radial direction for a predetermined minimum time, it can be assumed that the corresponding wheel electronics system 1a-4a is in use, and therefore the wheel electronics system 1a-4a automatically switches to its operational mode. The minimum acceleration is selected such that it corresponds to a speed of the LKW of approximately 25-30 km/h, for example.

In the case of the present exemplary embodiment, provision is made for regularly verifying the tires 1-4 of the LKW, and in particular their tire pressures. For this purpose, the LKW drives to a suitably equipped station featuring a device 14, with transmitters 15, 16, which is sunken into the floor. The transmitters 15, 16 are connected to a diagnostic device 17 and can be controlled by this. If wheels of the LKW are situated on the device 14, as shown for the front wheels of the LKW in FIG. 1, the transmitters 15, 16 of the device 14 are located close to the tires 1, 2 of the front wheels. The transmitters 15, 16 are configured to transmit trigger signals, corresponding to the trigger signals of the transmitters 6-9 of the LKW, such that the wheel electronics systems 1a, 2a transmit their messages containing the measured tire pressures of the tires 1, 2 after they have received the trigger signals from the transmitters 15, 16 of the device 14. The transmitted messages are received and processed further by the diagnostic device 17.

In the case of the present exemplary embodiment, provision is made for the wheel electronics systems 1a-4a to switch from their operational modes to their test modes automatically as a result of the following conditions:

If the acceleration sensor 22 does not measure any acceleration of the wheel electronics system 1a-4a for a predetermined duration, it can be assumed that the LKW is parked. In the case of the present exemplary embodiment, the wheel electronics system 1a-4a then switches from its operational mode to its test mode automatically (step A of the flow diagram in FIG. 3).

The predetermined duration is selected such that the wheel electronics system 1a-4a does not switch into the test mode in the case of a relatively short stoppage of the LKW, e.g. when halting in front of a red light. The predetermined duration is e.g. 15 minutes and can also be adjusted individually. It can therefore be assumed that the wheel electronics systems 1a-4a are in their test modes when the LKW is situated on the device 14. As a result of this, the verification of the tires 1-4 by means of the diagnostic device 17 can be carried out more quickly than if the wheel electronics systems 1a-4a are in their operational modes (step B of the flow diagram).

In the test mode, the energy consumption of the relevant wheel electronics system 1a-4a is greater than in the operational mode. In the case of the present exemplary embodiment, provision is therefore made for the diagnostic device 17 to transmit a signal to the wheel electronics systems 1a-4a by means of the transmitters 15, 16 after the verification is complete and, as a result of this signal, the corresponding wheel electronics systems 1a-4a switch back to their operational modes automatically (step C of the flow diagram).

In order to ensure that only the wheel electronics systems 1a-4a can receive trigger signals or signals originating from in front of the transmitters 15, 16 of the device 14, the transmitters 14, 15 can have a limited transmission range. This ensures that only those wheel electronics systems 1a-4a whose tires 1-4 have already been verified by means of the diagnostic device 17 are switched to their operational mode.

In the case of the present exemplary embodiment, provision is also made for the wheel electronics systems 1a-4a additionally to switch back to their operational modes after a further predetermined duration, even if they do not receive a switchover signal from the diagnostic device 17. This further duration can be between 1 hour and 24 hours, for example. Alternatively or additionally, the present exemplary embodiment provides for the wheel electronics systems 1a-4a to switch back to their operational modes automatically if their acceleration sensors 22 have measured the minimum acceleration for a specific time (step D of the flow diagram).

The invention claimed is:

1. A method for operating a wheel electronics system configured to interact with a tire attached to a vehicle and, as a result of a trigger signal received thereby, to generate and wirelessly transmit a message, the message comprising information about at least one tire parameter that is measured by the wheel electronics system, the method which comprises the following method steps:

operating the wheel electronics system in an operational mode in which the wheel electronics system is configured to receive the trigger signals periodically using a first time period;

in response to a predetermined first operating characteristic of the vehicle, automatically switching the wheel electronics system to a test mode in which the wheel electronics system is configured to receive the trigger signals periodically using a second time period that is significantly shorter than the first time period; and operating the wheel electronics system in the test mode;

wherein the predetermined first operating characteristic of the vehicle is a stoppage of the vehicle for a predefined first duration.

2. The method according to claim 1, which comprises measuring an acceleration of the tire with an acceleration sensor of the wheel electronics system and automatically switching the wheel electronics system from the operational mode to the test mode if the acceleration measured by the acceleration sensor during a first predetermined duration is less than a predetermined minimum acceleration.

3. The method according to claim 1, which comprises automatically switching the wheel electronics system from the test mode to the operational mode in response to a second operating characteristic of the vehicle.

4. The method according to claim 1, which comprises automatically switching the wheel electronics system from the test mode to the operational mode if, following a switchover from the operational mode to the test mode, at least one condition is met which is selected from the group consisting of:
- a predefined second duration has elapsed; and
- an acceleration sensor of the wheel electronics system measures a minimum acceleration of the tire over a predefined third duration.

5. The method according to claim 1, wherein the tire is mounted on a truck.

6. The method according to claim 5, which comprises:
driving the truck to a tire monitoring station;
stopping the truck;
transmitting trigger signals by way of transmitters of the tire monitoring station;
receiving the message containing information about measured parameters; and
analyzing the received message using a diagnostic device of the tire monitoring station.

7. The method according to claim 1, which comprises switching the wheel electronics system from the test mode to the operational mode as a result of a signal received by the wheel electronics system.

8. A wheel electronics system assembly, comprising:
a sensor for measuring at least one parameter of a tire, said sensor being mounted on a vehicle and interacting with a wheel electronics system during operation of the vehicle;
a receiver for receiving an external trigger signal;
a processing device configured to generate a message comprising information about the measured parameter of the tire when the receiver receives the trigger signal; and
a transmitter for transmitting the message with information about the measured parameter of the tire;
wherein the wheel electronics system is configured to receive the trigger signals periodically using a first time period in an operational mode and to receive the trigger signals using a second time period that is significantly shorter than the first time period in a test mode; and
wherein the wheel electronics system is configured to switch automatically from the operational mode to the test mode as a result of a predetermined first operating characteristic of the vehicle;
wherein the predetermined first operating characteristic of the vehicle is a stoppage of the vehicle for a predefined first duration.

9. The wheel electronics system assembly according to claim 8, which comprises an acceleration sensor for measuring an acceleration of the tire, and wherein the wheel electronics system is configured to switch from the operational mode to the test mode automatically if the acceleration measured by the acceleration sensor is less than a predetermined minimum acceleration during a first predetermined duration.

10. The wheel electronics system assembly according to claim 8, wherein said wheel electronics system is configured to automatically switch from the test mode to the operational mode as a result of a second operating characteristic of the vehicle.

11. The wheel electronics system assembly according to claim 8, wherein said wheel electronics system is configured to switch automatically from the test mode to the operational mode if, following a switchover from the operational mode to the test mode, at least one condition is met which is selected from the group consisting of:
- a predefined second duration has elapsed; and
- an acceleration sensor of said wheel electronics system measures a minimum acceleration of the tire over a predefined third duration.

12. The wheel electronics system assembly according to claim 8, wherein said wheel electronics system is configured to switch from the test mode to the operational mode as a result of a signal received by said wheel electronics system.

* * * * *